Oct. 6, 1970
G. W. BUSH
3,531,822
FLEXIBLE MOLDED PLASTIC HANDLE WITH CUSHIONING
GRIP CONTAINING AIR POCKETS
Filed Oct. 30, 1968
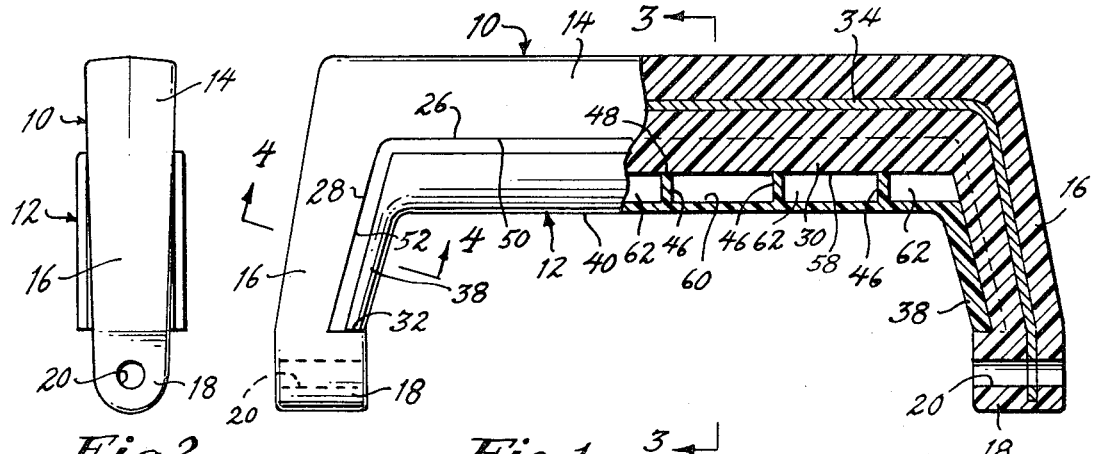
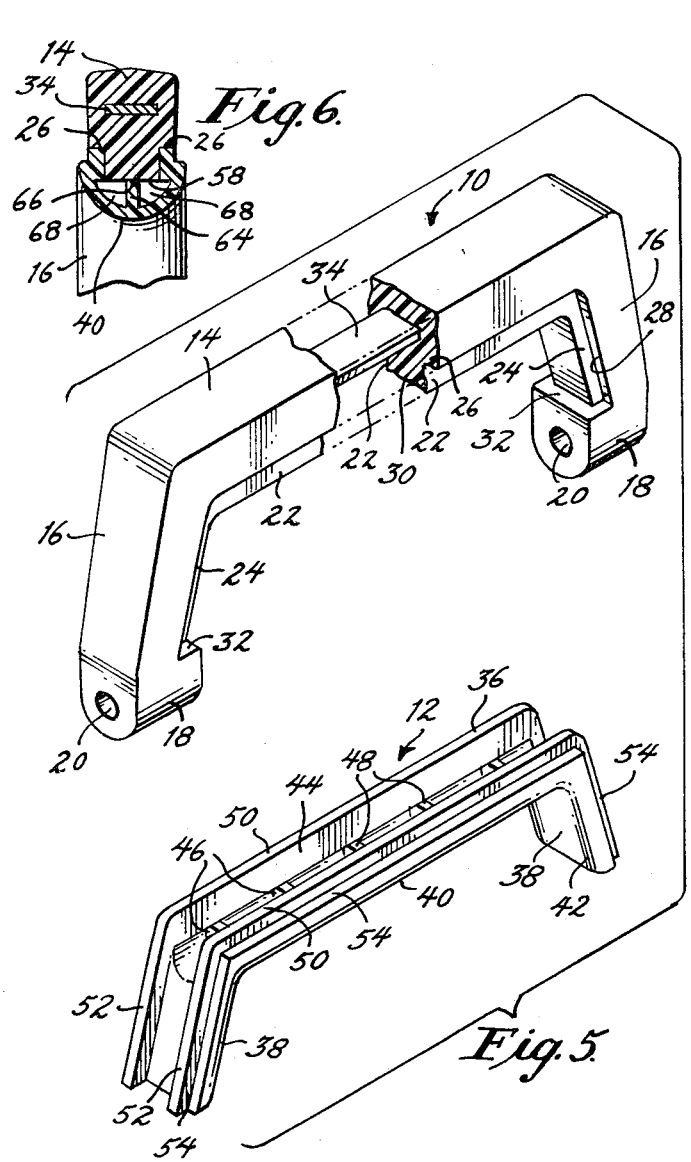
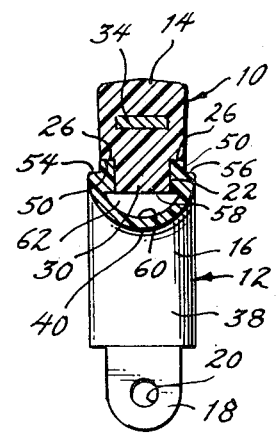
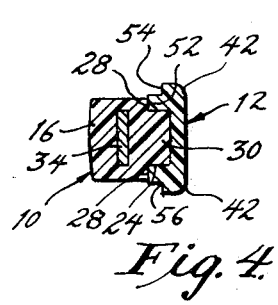
INVENTOR.
GEORGE W. BUSH
BY
Max R. Kullman
ATTORNEY.

United States Patent Office 3,531,822
Patented Oct. 6, 1970

3,531,822
FLEXIBLE MOLDED PLASTIC HANDLE WITH CUSHIONING GRIP CONTAINING AIR POCKETS
George W. Bush, Haddonfield, N.J., assignor to Philadelphia Handle Company, Inc., Camden, N.J., a corporation of New Jersey
Continuation-in-part of application Ser. No. 712,811, Mar. 13, 1968. This application Oct. 30, 1968, Ser. No. 771,947
Int. Cl. A47b 95/02
U.S. Cl. 16—110
7 Claims

ABSTRACT OF THE DISCLOSURE

A handle for portable radios, television sets, electronic instruments, luggage, carrying cases and the like made of a flexible soft-feel plastic, the finger-engaging portion of which being sealed in place to give a unitary appearance to the handle but which incorporates air pockets to provide a combined soft-feel and cushioning effect.

---

This invention relates to a soft-feel cushioned molded plastic handle for portable radios, television sets, electronic instruments, luggage carrying cases and the like and constitutes a continuation-in-part of my copending application Ser. No. 712,811 filed Mar. 13, 1968.

The primary object of the invention is to provide a handle made of a flexible soft-feel plastic in which the finger-engaging portion is in reality a separate unit molded with spaced ribs so that when it is sealed in place to the underside of the palm-engaging portion of the handle, an attractive, unitary-appearing, soft-feel, finger-cushioning handle is produced.

Another object of the invention is to provide a soft-feel, finger-cushioning molded plastic handle of the character described in which the palm-engaging portion is reinforced at the interior thereof with a non-springy metallic member so that the structural integrity and shape of the handle is retained at all times and the load support capacity thereof is increased without sacrificing the appearance, soft feel and cushioning effects thereof.

Another object of the invention is to provide a soft-feel, finger-cushioning, molded plastic handle in which the finger-cushioning portion and the flexible palm-engaging portion are made of plastics of substantially the same hardness but may be colored and textured alike or differently to produce different esthetic appeals without impairing the flexibility and cushioning functions thereof.

These and other objects of the invention will become more apparent as the following description proceeds in conjunction with the accompanying drawing, wherein:

FIG. 1 is a side elevational view of the handle, parts being broken away to show interior details;

FIG. 2 is an end elevational view thereof;

FIG. 3 is a sectional view taken on the line 3—3 of FIG. 1;

FIG. 4 is a sectional view taken on the line 4—4 of FIG. 1;

FIG. 5 is a group perspective view with parts broken away of the palm-engaging and finger-cushioning portions; and FIG. 6 is a view similar to FIG. 3 showing a modified form of the handle.

Specific reference is now made to the drawings wherein similar refeernce characters are used for corresponding elements throughout.

It should be understood that the handle shown herein is merely illustrative and is capable of being made in a variety of sizes, shapes, colors and textures, while embodying the principles of the invention. It consists essentially of a hand-grip comprising an outer member 10 and inner finger-engaging member 12. The outer member is preferably U-shaped and includes an elongated palm-engaging portion 14 joining a pair of depending arms 16 which terminate in outwardly-rounded bosses 18 through which horizontal bores 20 extend for the receipt of a hinge pin or other member (not shown) to hingedly or fixedly secure the handle to the wall of a portable radio, television set, electronic instrument, luggage, a carrying case, and the like. Substantially L-shaped recesses 22 are provided in the opposite sides of the palm-engaging portion 14 which are contiguous with similar recesses 24 on the opposite sides of the arms 16 to provide not only side opening recesses continuous throughout the length of the upper member 10 but also a continuous depending tongue portion 30. The recesses 22 form upper shoulders 26 while the arm recesses 24 form shoulders 28. The bosses 18 are also recessed at their upper inner edges to form flat ledges 32 which join the lower ends of the arm recesses 24.

The upper member 10 is molded of a flexible suitably colored and textured plastic such as polyvinyl chloride, nylon, etc. with a Shore "A" durometer hardness of about 75–85. This produces a soft feel. To increase the load supporting capacity and to maintain the structural and shape integrity of the member, an elongated non-springy metallic bar 34 is embedded in the interior thereof by molding therewith and extends throughout the length of the member, that is the palm-engaging portion 14, the arms 16 and the bosses 18.

The inner finger-engaging member 12 is also made of a flexible plastic which may be of the same or different chemical composition as that of the outer member 10 but is of substantially the same hardness, i.e. 75–85 Shore "A" durometer. The relative compositions of the inner and outer members 10 and 12 must merely be such as to permit them to be sealed together, preferably electronically.

The inner member 12 is molded in a single piece and comprises an elongated portion 36 which is substantially coextensive with the length of the palm-engaging portion 14 at its underside and depending arms 38 which are substantially coextensive with the arms 16 of the outer member 14 from their loci of juncture with the portion 14 to the ledges 32. The outer surface 40 of the portion 36 is preferably rounded for comfort as are the edges 42 of the arms 38.

The member 12 is molded to provide an inner channel 44 extending throughout the length of the portion 36 and arms 38 with transversely extending, longitudinally spaced ribs 46 in the portion 36 whose upper edges 48 are spaced beneath the outer and side upper edges 50 and 52 of the channel 44. While no transverse ribs are shown in the channel of the arms 38, it will be understood that they can be included therein as well, if desired, to provide side cushioning of the fingers. Along the peripheral length of the member 12 beneath and inwardly of the edges 50 and 52, the opposite sides of the member are provided with substantially L-shaped recesses 54 and 56.

As suggested in FIGS. 1 and 5, the inner member 12 is positioned beneath and into the outer member 10 until the edges 50 and 52 of the inner member 12 engage the shoulders 26 and 28 respectively of the outer member 10 and then the members are sealed, preferably electronically or by equivalent means. Although the contour of the finger-engaging inner member 12 is shown with its outer surface projecting beyond that of the outer member 10, the surfaces may be flush and of continuous shape instead.

When the edges 50 and 52 of the inner finger-engaging member 12 are secured to the shoulders 26 and 28 respectively of the outer or palm-engaging member 10, the central tongue 30 of the outer member extends into the channel 44 of the inner member and its free edges 58 engages the upper edges 48 of the ribs 46 thereby forming between the ribs 46, the inner surface 60 of the channel 44 and the free edge 58 a plurality of closed air pockets or cells 62 rendering the inner member 12 compressibly resilient to cushion the fingers. And, since both the outer palm-engaging member 10 and the inner finger-engaging member 12 are made of a flexible plastic, the feel of the handle is soft throughout and cushions the fingers. The spacing of the ribs 46 and inner wall 60 of the channel 44 from the edge 58 of the tongue 30 will determine the degree of compressibility. In practice it has been found that good cushioning results from ribs spaced apart about ¼ in., to approximate normal spacing between the fingers, with each air pocket having a volume of about 3/64 cu. in.

While FIGS. 1–5 show the use of transverse, longitudinally spaced ribs 46, as seen in FIG. 6, a single longitudinal rib 64 may be provided in the finger-engaging member 12 whose upper edge 66 will abut the edge 58 of the tongue 30 to form a pair of air pockets 68 on both sides of the rib 64 running lengthwise of the member 12. If desired the longitudinal rib 64 may be combined with the transverse ribs 46 in a single construction to provide a greater number of air pockets and thus a stiffer cushioning effect.

While preferred embodiments have here been shown and described, it is understood that skilled artisans may make minor variations without departing from the spirit of the invention.

I claim:

1. A soft feel handle for attachment to carrying cases and the like comparing complementary substantially U-shaped outer and inner plastic members each including a horizontal portion and depending arms, the outer or palm-engaging member including side recesses forming peripheral shoulders and a narrower substantially coextensive tongue with a lower free edge, the inner or finger-engaging member including an upwardly opening channel substantially coextensive therewith having upper free edges, the tongue fitting into the channel until the shoulders and the upper free edges of the channel meet, at which point the lower free edge of the tongue is spaced above the bottom inner face of the channel to form an air pocket, and heat sealing means bonding the shoulders and the upper free edges of the channel together.

2. The handle of claim 1 and transversely extending, longitudinally spaced ribs in the channel having upper edges spaced above the bottom inner face of the channel and contacting the lower free edge of the tongue.

3. The handle of claim 1 and a longitudinal rib upstanding from the bottom inner face of the channel and contacting the lower free edge of the tongue.

4. The handle of claim 1 and recesses in the sides of the inner member externally of the channel forming peripheral shoulders beneath the upper fre edges of the channel forming bulging side portions in the inner finger-gripping member.

5. The handle of claim 8 and a stiffener embedded in said palm-engaging member.

6. The handle of claim 5 wherein the plastic from which said finger-engaging and palm-engaging members are made have substantially the same hardness.

7. The handle of claim 6 wherein said stiffener is a metallic bar extending the complete length of said palm-engaging member.

References Cited
UNITED STATES PATENTS

| | | | |
|---|---|---|---|
| 2,913,080 | 11/1959 | Louik et al. | 190—57 |
| 3,009,955 | 11/1961 | Kotkins | 190—57 |

BOBBY R. GAY, Primary Examiner

D. L. TROUTMAN, Assistant Examiner

UNITED STATES PATENT OFFICE
CERTIFICATE OF CORRECTION

Patent No. 3,531,822                                   October 6, 1970

George W. Bush

It is certified that error appears in the above identified patent and that said Letters Patent are hereby corrected as shown below:

Column 3, line 34, "comparing" should read -- comprising --.

Signed and sealed this 6th day of April 1971.

(SEAL)
Attest:

EDWARD M. FLETCHER, JR.                     WILLIAM E. SCHUYLER, JR.
Attesting Officer                             Commissioner of Patents